United States Patent
Um et al.

(10) Patent No.: US 11,491,984 B2
(45) Date of Patent: Nov. 8, 2022

(54) APPARATUS AND METHOD FOR PROVIDING DRIVING PATH IN VEHICLE

(71) Applicants: HYUNDAI MOTOR COMPANY, Seoul (KR); KIA MOTORS CORPORATION, Seoul (KR)

(72) Inventors: Doo Jin Um, Seoul (KR); Hoi Won Kim, Gwacheon-si (KR); Beom Jun Kim, Seoul (KR); Dae Young Kim, Gwangmyeong-si (KR); Chan Il Park, Chungcheongbuk-do (KR); Jin Su Jeong, Suwon-si (KR); Dong Eon Oh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/378,203

(22) Filed: Apr. 8, 2019

(65) Prior Publication Data

US 2019/0315367 A1    Oct. 17, 2019

Related U.S. Application Data

(60) Provisional application No. 62/655,831, filed on Apr. 11, 2018.

(30) Foreign Application Priority Data

Nov. 16, 2018 (KR) .......................... 10-2018-0142013

(51) Int. Cl.
*B60W 30/18* (2012.01)
*G08G 1/16* (2006.01)
(Continued)

(52) U.S. Cl.
CPC .. *B60W 30/18163* (2013.01); *B60W 30/0956* (2013.01); *B60W 50/087* (2013.01); *G08G 1/167* (2013.01)

(58) Field of Classification Search
CPC ........... B60W 30/12; B60W 30/18163; G08G 1/167; B62D 15/0255; G05D 1/0088; G05D 1/0212; G05D 1/0214
See application file for complete search history.

(56) References Cited

U.S. PATENT DOCUMENTS 4,361,202 A    11/1982    Minovitch
5,314,037 A    5/1994     Shaw
(Continued)

FOREIGN PATENT DOCUMENTS

DE    198 21 122 A1    6/1999
DE    101 14 187 A1    9/2002
(Continued)

OTHER PUBLICATIONS

EPO machine translation of DE 102016216134A1 (original DE document published Mar. 1, 2018) (Year: 2018).*
(Continued)

*Primary Examiner* — David A Testardi
(74) *Attorney, Agent, or Firm* — Morgan, Lewis & Bockius LLP

(57) ABSTRACT

An apparatus for providing a traveling in a vehicle is provided. The apparatus includes a plurality of sensors configured to obtain information about the vehicle and information about an external object, a steering device, an input device configured to receive a lane change command from a driver of the vehicle, and a control circuit configured to be electrically connected with the one or more sensors, the steering device, and the input device. The control circuit is configured to control the vehicle to travel along a deviated (Continued)

----- : DEVIATED PATH

----- : LANE CENTERING PATH path in a driving path of the vehicle based on at least one of the information obtained by the plurality of sensors or an operation of the steering device, to complete a lane change, and to control the vehicle to travel along a deviated path in a target lane of the changed lane in response to the received lane change command.

14 Claims, 10 Drawing Sheets

(51) Int. Cl.
*B60W 30/095* (2012.01)
*B60W 50/08* (2020.01)

(56) References Cited

U.S. PATENT DOCUMENTS

| | | | |
|---|---|---|---|
| 5,521,579 | A | 5/1996 | Bernhard |
| 6,055,467 | A | 4/2000 | Mehring et al. |
| 6,473,678 | B1* | 10/2002 | Satoh ................. B62D 1/28 |
| | | | 180/168 |
| 6,842,687 | B2 | 1/2005 | Winner et al. |
| 7,363,140 | B2 | 4/2008 | Ewerhart et al. |
| 7,821,421 | B2 | 10/2010 | Tamir et al. |
| 8,073,595 | B2 | 12/2011 | Tabata et al. |
| 8,457,827 | B1 | 6/2013 | Ferguson et al. |
| 8,521,352 | B1 | 8/2013 | Ferguson et al. |
| 8,798,841 | B1 | 8/2014 | Nickolaou et al. |
| 8,874,301 | B1 | 10/2014 | Rao et al. |
| 9,079,571 | B2 | 7/2015 | Trost et al. |
| 9,134,731 | B2 | 9/2015 | Healey et al. |
| 9,315,178 | B1 | 4/2016 | Ferguson et al. |
| 9,527,441 | B2 | 12/2016 | Matsumura |
| 9,682,725 | B2 | 6/2017 | Yamaoka |
| 9,874,871 | B1 | 1/2018 | Zhu et al. |
| 10,131,356 | B2 | 11/2018 | Takae |
| 10,152,883 | B2 | 12/2018 | Fujimaki |
| 10,183,668 | B2 | 1/2019 | Takae |
| 10,202,123 | B2 | 2/2019 | Aoki |
| 10,259,459 | B2 | 4/2019 | Takae |
| 10,286,907 | B2 | 5/2019 | Nishiguchi et al. |
| 10,324,463 | B1 | 6/2019 | Konrardy et al. |
| 10,449,856 | B2 | 10/2019 | Kojima |
| 10,449,971 | B2 | 10/2019 | Arakawa et al. |
| 10,451,730 | B2 | 10/2019 | Talamonti et al. |
| 10,558,213 | B2 | 2/2020 | Sato et al. |
| 10,618,523 | B1 | 4/2020 | Fields et al. |
| 10,627,813 | B2 | 4/2020 | Tsuji et al. |
| 10,663,971 | B2 | 5/2020 | Sugawara et al. |
| 10,676,084 | B2 | 6/2020 | Fujii |
| 10,814,913 | B2 | 10/2020 | Fujii |
| 10,935,974 | B1 | 3/2021 | Fields et al. |
| 2003/0163239 | A1 | 8/2003 | Winner et al. |
| 2005/0137782 | A1 | 6/2005 | Shinada |
| 2005/0228588 | A1* | 10/2005 | Braeuchle .......... B60W 30/12 |
| | | | 701/301 |
| 2005/0256630 | A1 | 11/2005 | Nishira et al. |
| 2006/0009910 | A1 | 1/2006 | Ewerhart et al. |
| 2007/0043505 | A1* | 2/2007 | Leicht ................ B62D 15/029 |
| | | | 701/301 |
| 2007/0255474 | A1 | 11/2007 | Hayakawa et al. |
| 2008/0172153 | A1 | 7/2008 | Ozaki et al. |
| 2008/0204212 | A1 | 8/2008 | Jordan et al. |
| 2009/0005933 | A1 | 1/2009 | Tabata et al. |
| 2009/0088925 | A1 | 4/2009 | Sugawara et al. |
| 2009/0132125 | A1 | 5/2009 | Yonezawa et al. |
| 2009/0171533 | A1* | 7/2009 | Kataoka ............ B60W 30/12 |
| | | | 701/41 |
| 2009/0194350 | A1* | 8/2009 | Rattapon ............ B62D 1/286 |
| | | | 180/169 |
| 2009/0299573 | A1 | 12/2009 | Thrun et al. |
| 2009/0319113 | A1* | 12/2009 | Lee .................. B62D 15/0255 |
| | | | 701/25 |
| 2010/0010733 | A1 | 1/2010 | Krumm |
| 2010/0042282 | A1 | 2/2010 | Taguchi et al. |
| 2010/0289632 | A1 | 11/2010 | Seder et al. |
| 2011/0169625 | A1 | 7/2011 | James et al. |
| 2011/0196592 | A1 | 8/2011 | Kashi et al. |
| 2011/0241862 | A1 | 10/2011 | Debouk et al. |
| 2011/0251758 | A1* | 10/2011 | Kataoka ............. B62D 15/025 |
| | | | 701/41 |
| 2011/0293145 | A1 | 12/2011 | Nogami et al. |
| 2012/0166032 | A1* | 6/2012 | Lee ..................... B62D 1/286 |
| | | | 701/23 |
| 2012/0283907 | A1* | 11/2012 | Lee .................... B60T 8/17557 |
| | | | 701/32.9 |
| 2012/0296522 | A1* | 11/2012 | Otuka .................. B60W 30/12 |
| | | | 701/41 |
| 2013/0063595 | A1 | 3/2013 | Niem |
| 2013/0066525 | A1 | 3/2013 | Tomik et al. |
| 2013/0226406 | A1* | 8/2013 | Ueda .................... B62D 1/28 |
| | | | 701/41 |
| 2013/0253793 | A1* | 9/2013 | Lee .................... B60W 50/029 |
| | | | 701/70 |
| 2014/0074356 | A1 | 3/2014 | Bone |
| 2014/0309855 | A1 | 10/2014 | Tran |
| 2014/0336896 | A1 | 11/2014 | Udaka et al. |
| 2015/0006012 | A1 | 1/2015 | Kammel et al. |
| 2015/0006013 | A1 | 1/2015 | Wimmer et al. |
| 2015/0019063 | A1 | 1/2015 | Lu et al. |
| 2015/0094899 | A1 | 4/2015 | Hackenberg et al. |
| 2015/0148985 | A1 | 5/2015 | Jo |
| 2015/0166062 | A1 | 6/2015 | Johnson et al. |
| 2015/0204687 | A1 | 7/2015 | Yoon et al. |
| 2015/0353082 | A1 | 12/2015 | Lee et al. |
| 2015/0355641 | A1* | 12/2015 | Choi .................... G05D 1/021 |
| | | | 701/23 |
| 2015/0360721 | A1 | 12/2015 | Matsuno et al. |
| 2016/0001781 | A1 | 1/2016 | Fung et al. |
| 2016/0091897 | A1 | 3/2016 | Nilsson et al. |
| 2016/0107682 | A1* | 4/2016 | Tan ........................ B62D 6/00 |
| | | | 701/41 |
| 2016/0107687 | A1* | 4/2016 | Yamaoka ............ B62D 15/0255 |
| | | | 701/41 |
| 2016/0187879 | A1 | 6/2016 | Mere et al. |
| 2016/0225261 | A1 | 8/2016 | Matsumoto |
| 2016/0250968 | A1 | 9/2016 | Shirakata et al. |
| 2016/0272204 | A1 | 9/2016 | Takahashi et al. |
| 2016/0288707 | A1 | 10/2016 | Matsumura |
| 2016/0297431 | A1 | 10/2016 | Eigel et al. |
| 2016/0297447 | A1 | 10/2016 | Suzuki |
| 2016/0339913 | A1 | 11/2016 | Yamashita et al. |
| 2016/0349066 | A1 | 12/2016 | Chung et al. |
| 2016/0368492 | A1 | 12/2016 | Al-Stouhi |
| 2017/0003683 | A1* | 1/2017 | Sato .................... B62D 15/025 |
| 2017/0061799 | A1* | 3/2017 | Fujii .................... B60W 30/12 |
| 2017/0108865 | A1 | 4/2017 | Rohde et al. |
| 2017/0124882 | A1 | 5/2017 | Wang |
| 2017/0148327 | A1* | 5/2017 | Sim .................... G08G 1/167 |
| 2017/0171375 | A1 | 6/2017 | Kamata |
| 2017/0183007 | A1* | 6/2017 | Oh ..................... B60W 30/09 |
| 2017/0197637 | A1 | 7/2017 | Yamada et al. |
| 2017/0203763 | A1 | 7/2017 | Yamada et al. |
| 2017/0203764 | A1 | 7/2017 | Fujiki et al. |
| 2017/0240172 | A1 | 8/2017 | Nishiguchi |
| 2017/0240186 | A1 | 8/2017 | Hatano |
| 2017/0243491 | A1 | 8/2017 | Fujii et al. |
| 2017/0291603 | A1 | 10/2017 | Nakamura |
| 2017/0308094 | A1 | 10/2017 | Abe |
| 2017/0313313 | A1 | 11/2017 | Asakura |
| 2017/0315556 | A1 | 11/2017 | Mimura |
| 2017/0334460 | A1 | 11/2017 | Arakawa et al. |
| 2017/0341652 | A1 | 11/2017 | Sugawara et al. |
| 2017/0341653 | A1 | 11/2017 | Kubota et al. |
| 2017/0349212 | A1 | 12/2017 | Oshida et al. |
| 2017/0368936 | A1 | 12/2017 | Kojima |
| 2018/0009437 | A1 | 1/2018 | Ooba |
| 2018/0029604 | A1 | 2/2018 | Niino et al. |
| 2018/0033309 | A1 | 2/2018 | Norwood |
| 2018/0037260 | A1* | 2/2018 | Otake ................. G05D 1/0212 |
| 2018/0043906 | A1 | 2/2018 | Huang |

(56) References Cited

U.S. PATENT DOCUMENTS

| | | |
|---|---|---|
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1 | 6/2018 | Kabe |
| 2018/0162416 A1 | 6/2018 | Honda et al. |
| 2018/0170370 A1* | 6/2018 | Kataoka ............ B60W 30/09 |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto et al. |
| 2018/0178802 A1 | 6/2018 | Miyata |
| 2018/0186376 A1 | 7/2018 | Lee et al. |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0215388 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0257669 A1 | 9/2018 | Makke et al. |
| 2018/0281788 A1 | 10/2018 | Uchida |
| 2018/0290666 A1* | 10/2018 | Ichikawa ............ B60W 30/10 |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1* | 12/2018 | Fujii ............ B60W 30/0956 |
| 2018/0345960 A1* | 12/2018 | Fujii ............ B60W 30/0953 |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1* | 12/2018 | Miyata ............ B60W 10/20 |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1* | 1/2019 | Fujiki ............ B62D 6/001 |
| 2019/0026918 A1 | 1/2019 | Gomezcaballero et al. |
| 2019/0047469 A1 | 2/2019 | Nishiguchi et al. |
| 2019/0047561 A1 | 2/2019 | Nishiguchi et al. |
| 2019/0049958 A1 | 2/2019 | Liu et al. |
| 2019/0061766 A1* | 2/2019 | Nishiguchi ..... B60W 30/18163 |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0126927 A1 | 5/2019 | Uejima |
| 2019/0135290 A1 | 5/2019 | Marden et al. |
| 2019/0155279 A1 | 5/2019 | Tayama |
| 2019/0161117 A1* | 5/2019 | Suzuki ............ B62D 15/025 |
| 2019/0168754 A1 | 6/2019 | Makled |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241158 A1 | 8/2019 | Ghannam et al. |
| 2019/0241198 A1 | 8/2019 | Mori et al. |
| 2019/0250620 A1 | 8/2019 | Huang |
| 2019/0256064 A1 | 8/2019 | Hecker et al. |
| 2019/0263411 A1* | 8/2019 | Saikyo ............ B60W 30/18163 |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Moto |
| 2019/0291642 A1 | 9/2019 | Chae et al. |
| 2019/0291728 A1 | 9/2019 | Shalev-Shwartz et al. |
| 2019/0302763 A1* | 10/2019 | Kondo ............ B60W 30/10 |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1* | 11/2019 | Zhu ............ G05D 1/0255 |
| 2019/0391580 A1 | 12/2019 | Di Cairano et al. |
| 2020/0001714 A1 | 1/2020 | Kojima |
| 2020/0049513 A1* | 2/2020 | Ma ............ G06V 20/584 |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0189618 A1* | 6/2020 | Ochida ............ B60W 30/18118 |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |
| 2021/0188258 A1* | 6/2021 | Goto ............ B60W 30/16 |
| 2021/0188262 A1* | 6/2021 | Goto ............ G06K 9/00845 |
| 2021/0188356 A1* | 6/2021 | Goto ............ B60W 30/10 |

FOREIGN PATENT DOCUMENTS

| | | | |
|---|---|---|---|
| DE | 102004005815 B3 | 6/2005 | |
| DE | 10 2004 048 468 A1 | 4/2006 | |
| DE | 10 2007 005 245 A1 | 11/2007 | |
| DE | 10 2011 016 770 A1 | 11/2011 | |
| DE | 102011016770 A1 * | 11/2011 | |
| DE | 10 2011 016 771 A1 | 10/2012 | |
| DE | 102011016771 A1 * | 10/2012 | ............ B60W 10/18 |
| DE | 10 2012 001405 A1 | 11/2012 | |
| DE | 10 2011 109618 A1 | 2/2013 | |
| DE | 10 2012 008090 A1 | 10/2013 | |
| DE | 10 2014 225 680 A1 | 6/2016 | |
| DE | 10 2015 205131 A1 | 9/2016 | |
| DE | 102016202946 A1 | 9/2016 | |
| DE | 102015206969 A1 | 10/2016 | |
| DE | 102015209476 A1 | 11/2016 | |
| DE | 102015219231 A1 | 4/2017 | |
| DE | 10 2016 007187 A1 | 6/2017 | |
| DE | 102015224244 A1 | 6/2017 | |
| DE | 10 2016 215565 A1 | 2/2018 | |
| DE | 10 2016 216134 A1 | 3/2018 | |
| DE | 102016216134 A1 * | 3/2018 | |
| EP | 1074904 A1 | 2/2001 | |
| EP | 1607264 A1 | 12/2005 | |
| EP | 2116984 A1 | 11/2009 | |
| EP | 2657921 A1 | 10/2013 | |
| EP | 2978648 A1 | 2/2016 | |
| EP | 3075618 A2 | 10/2016 | |
| EP | 3239960 A1 | 11/2017 | |
| EP | 3 264 211 A1 | 1/2018 | |
| EP | 3284646 A1 | 2/2018 | |
| EP | 3075618 A3 | 5/2018 | |
| JP | 2000-020898 A | 1/2000 | |
| JP | 2000-198458 A | 7/2000 | |
| JP | 2000198458 A * | 7/2000 | |
| JP | 2003-025868 A | 1/2003 | |
| JP | 2008-515701 A | 5/2008 | |
| JP | 2015-066962 A | 4/2015 | |
| JP | 2015075889 A | 4/2015 | |
| JP | 2015-138330 A | 7/2015 | |
| JP | 2016-000602 A | 1/2016 | |
| JP | 2016-011031 A | 1/2016 | |
| JP | 2016000602 A * | 1/2016 | |
| JP | 2016-151815 A | 8/2016 | |
| JP | 2016-196285 A | 11/2016 | |
| JP | 2016-207060 A | 12/2016 | |
| JP | 2017-062696 A | 3/2017 | |
| JP | 2017-138899 A | 8/2017 | |
| JP | 2017-210034 A | 11/2017 | |
| JP | 2017-217969 A | 12/2017 | |
| JP | 2018-047737 A | 3/2018 | |
| JP | 2019-043169 A | 3/2019 | |
| JP | 2019043169 A * | 3/2019 | ............ B60W 10/18 |

(56) References Cited

FOREIGN PATENT DOCUMENTS

| | | |
|---|---|---|
| KR | 10-0578573 B2 | 5/2006 |
| KR | 10-2011-0065013 A | 6/2011 |
| KR | 10-2016-0004835 A | 1/2016 |
| KR | 10-2016-0023850 A | 3/2016 |
| KR | 101779823 B1 | 10/2017 |
| KR | 10-2018-0022900 A | 3/2018 |
| KR | 10-2018-0023981 A | 3/2018 |
| KR | 20180070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | WO 2017064941 A1 | 4/2017 |
| WO | 2017-168013 A1 | 10/2017 |
| WO | WO 2017168013 A1 | 10/2017 |
| WO | 2018-033389 A1 | 2/2018 |
| WO | 2017-017793 A1 | 6/2018 |

OTHER PUBLICATIONS

EPO machine translation of JP 2019-043169A (original JP document published Mar. 22, 2019) (Year: 2019).*
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action issued on Mar. 25, 2020 from the corresponding U.S. Appl. No. 16/204,362 , 27 pp.
U.S. Office Action dated Apr. 24, 2020 from the corresponding U.S. Appl. No. 16/203,884 , 25 pp.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
Office Action dated Dec. 10, 2020 from the corresponding U.S. Appl. No. 16/269,140, 31 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Application No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.
European Search Opinion in Application 19167267.4—1012 dated Mar. 8, 2021 (Year: 2021).

* cited by examiner

APPARATUS AND METHOD FOR PROVIDING DRIVING PATH IN VEHICLE

CROSS-REFERENCE TO RELATED APPLICATION

The present application claims priority to and the benefit of Korean Patent Application No. 10-2018-0142013, filed in the Korean Intellectual Property Office on Nov. 16, 2018, which claims priority to and the benefit of U.S. Patent Application No. 62/655,831, filed on Apr. 11, 2018, the entire contents of which are incorporated herein by reference.

TECHNICAL FIELD

The present disclosure relates to an apparatus and method for providing a driving path in a vehicle upon a lane change of the vehicle.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). The autonomous system may generate a path for the autonomous driving and may perform a lane change along the generated path.

While performing the autonomous driving, the vehicle may travel along a path following the center of a lane where it is traveling. The vehicle may travel along a deviated path which departs from the lane center in the lane by an intention of its driver. When the vehicle performs an automatic lane change, in some cases, there is a need for reflecting the above-mentioned deviated driving to generate a path.

SUMMARY

An aspect of the present disclosure provides an apparatus and method for performing a lane change and generating and providing a deviated driving path in a target lane of the lane change.

The technical problems to be solved by the present inventive concept are not limited to the aforementioned problems, and any other technical problems not mentioned herein will be clearly understood from the following description by those skilled in the art to which the present disclosure pertains.

In one aspect of the present disclosure, an apparatus for providing a driving path in a vehicle may include: one or more sensors configured to obtain information about the vehicle and information about an external object, a steering device, an input device configured to receive a lane change command from a driver of the vehicle, and a control circuit configured to be electrically connected with the one or more sensors, the steering device, and the input device. The control circuit may be configured to control the vehicle to travel along a deviated path in a driving path of the vehicle based on at least a portion of the information obtained by the one or more sensors or an operation of the steering device and control the vehicle to complete a lane change and travel along a deviated path in a target lane of the lane change, when the lane change command is received by the input device while the vehicle travels along the deviated path in the driving path.

In some forms of the present disclosure, the control circuit may be configured to determine an intention of a driver of the vehicle to perform deviated driving, based on the operation of the steering device and generate the deviated path in the target lane, when the lane change command is received while the driver intends to perform the deviated driving.

In some forms of the present disclosure, the control circuit may be configured to determine that the driver intends to perform the deviated driving, when a steering torque greater than a specified value is generated during a specified time and when the vehicle is away from the center of the driving lane over a specified distance.

In some forms of the present disclosure, the control circuit may be configured to determine an intention of a driver of the vehicle to perform deviated driving, based on the operation of the steering device and generate a lane centering path in the target lane, when the lane change command is received while the driver does not intend to perform the deviated driving.

In some forms of the present disclosure, the control circuit may be configured to determine that the driver does not intend to perform the deviated driving, when a steering torque less than or equal to a specified value is generated during a specified time and the vehicle is away from the center of the driving lane over a specified distance.

In some forms of the present disclosure, the control circuit may be configured to generate the deviated path in the target lane such that the vehicle is away from the external object, when the external object is detected in a specified area of a lane neighboring to the target lane.

In some forms of the present disclosure, the control circuit may be configured to determine whether to generate the deviated path in the target lane, after the vehicle enters the target lane.

In some forms of the present disclosure, the control circuit may be configured to control the vehicle to travel along a lane centering path in the target lane, when a lateral position error is greater than a specified value during a specified time.

In some forms of the present disclosure, the control circuit may be configured to control the vehicle to travel along a lane centering path in the target lane, when lateral acceleration of the vehicle is greater than a specified value.

In some forms of the present disclosure, a method for providing a driving path in a vehicle may include: controlling the vehicle to travel along a deviated path in a driving path of the vehicle based on at least a portion of information about the vehicle, information about an external object, or an operation of a steering wheel of the vehicle and controlling the vehicle to complete a lane change and travel along a deviated path in a target lane of the lane change, when the lane change command is received from a driver of the vehicle while the vehicle travels along the deviated path in the driving path.

In some forms of the present disclosure, the controlling the vehicle to travel along the deviated path in the driving lane may include determining an intention of the driver of the vehicle to perform deviated driving, based on the operation of the steering device. The controlling the vehicle to travel along the deviated path in the target lane may include generating the deviated path in the target lane, when the lane change command is received while the driver intends to perform the deviated driving.

In some forms of the present disclosure, the method may further include generating a lane centering path in the target lane, when the lane change command is received while the driver does not intend to perform the deviated driving.

In some forms of the present disclosure, the controlling the vehicle to travel along the deviated path in the target lane may include generating the deviated path in the target lane such that the vehicle is away from the external object, when the external object is detected in a specified area of a lane neighboring to the target lane.

In some forms of the present disclosure, the method may further include controlling the vehicle to travel along a lane centering path in the target lane, when a lateral position error is greater than a specified value during a specified time.

In some forms of the present disclosure, the method may further include controlling the vehicle to travel along a lane centering path in the target lane, when lateral acceleration of the vehicle is greater than a specified value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
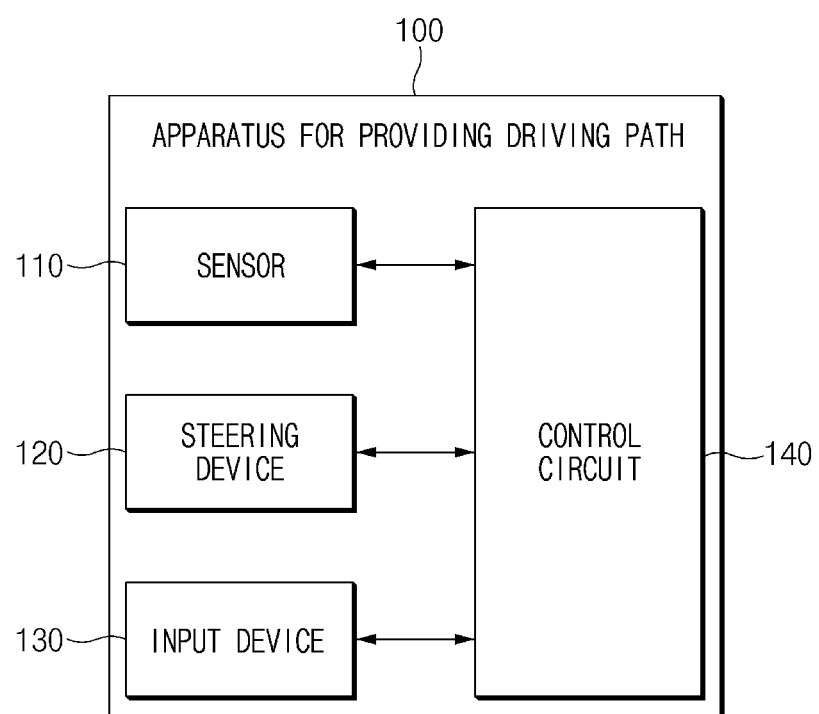
FIG. 1 is a block diagram illustrating a configuration of an apparatus for providing a driving path in a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing elements of some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for providing a driving path in a vehicle in some forms of the present disclosure.

Referring to FIG. 1, an apparatus 100 for providing a driving path in a vehicle in some forms of the present disclosure may include a sensor 110, a steering device 120, an input device 130, and a control circuit 140. The apparatus 100 for providing a driving path in FIG. 1 may be a portion of an autonomous system and may be loaded into the vehicle.

The sensor 110 may be configured to sense information about the vehicle loaded with the apparatus 100 for providing the driving path and information about an external object. The sensor 110 may sense a preceding vehicle, a following vehicle, a side vehicle, a line on a road, a median strip, a guide rail, another external object, and the like, and may sense a speed, a steering angle, a steering torque, a wheel speed, a yaw rate, and the like of the vehicle. The sensor 110 may include, for example, a camera, a radar, a light detection and ranging (LiDAR), a speed sensor, an angle sensor, a torque sensor, a wheel speed sensor, and/or a yaw rate sensor.

The steering device 120 may adjust a driving direction of the vehicle. The steering device 120 may include a steering wheel or the like and may be controlled by a driver and/or an autonomous system of the vehicle.

The input device 130 may be configured to receive a lane change command from the driver of the vehicle. The input device 130 may be, for example, a turn signal lever, a switch, and/or a button.

The control circuit 140 may be electrically connected with the sensor 110, the steering device 120, and the input device 130. The control circuit 140 may control the sensor 110, the steering device 120, and the input device 130 and may perform a variety of data processing and various arithmetic operations. The control circuit 140 may be, for example, an electronic control unit (ECU), a micro controller unit (MCU), or a sub-controller, which is loaded into the vehicle.

In some forms of the present disclosure, the control circuit 140 may control the vehicle to travel along a deviated path in a driving lane of the vehicle, based on at least a portion of the information obtained by the sensor 110 or an operation of the steering device 120. The control circuit 140 may determine an intention of the driver to perform deviated driving, based on information of the sensor 110 and/or an operation of the steering device 120. The control circuit 140 may perform deviated driving in the driving lane depending to an intention of the driver or a situation outside the vehicle.

In some forms of the present disclosure, while the vehicle travels along the deviated path in the driving lane, when a lane change command is received by the input device 130, the control circuit 140 may control the vehicle to complete a lane change and travel along a deviated path in a target lane of the lane change. For example, when the vehicle performs the deviated driving before the lane change command is received, the control circuit 140 may control the vehicle to perform the deviated driving after completing the lane change. When the vehicle performs the deviated driving, the control circuit 140 may consider an intention of the driver to perform the deviated driving.

In some forms of the present disclosure, the control circuit 140 may determine an intention of the driver to perform deviated driving, based on an operation of the steering device 120. While the driver intends to perform the deviated driving, when a lane change command is received, the control circuit 140 may generate a deviated path in a target lane of the lane change. For example, when a steering torque greater than a specified value is generated during a specified time and when the vehicle is away from the center of its driving lane over a specified distance, the control circuit 140 may determine that the driver intends to perform a deviated driving by controlling the steering vehicle 120.

In some forms of the present disclosure, while the driver does not intend to perform a deviated driving, when a lane change command is received, the control circuit 140 may generate a lane centering path in the target lane. For example, when a steering torque less than or equal to the specified value is generated during the specified time and when the vehicle is away from the center of the driving lane over the specified distance, since the driver does not control the steering device 120 to perform the deviated driving, the control circuit 140 may determine that the driver does not intend to perform the deviated driving.

In some forms of the present disclosure, when an external object is detected in a specified area of a lane neighboring to the target lane, the control circuit 140 may generate a deviated path in the target lane such that the vehicle is away from the external object. When the external object on the lane neighboring to the target lane is adjacent to the vehicle, the driver may feel anxious. When the external object on the lane neighboring to the target lane is located within a specified area from the vehicle, the control circuit 140 may perform a deviated driving in a direction away from the external object. After the vehicle enters the target lane, the control circuit 140 may determine whether to generate a deviated path in the target lane in consideration of the external object located on the lane neighboring to the target lane.

In some forms of the present disclosure, when it is not safe to perform the deviated driving, the control circuit 140 may control vehicle to perform lane centering. For example, when a lateral position error (e.g., a distance between a path generated by the system and a real driving path) is greater than a specified value during a specified time, the control circuit 140 may determine that path following performance of the vehicle is degraded and may control the vehicle to travel along a lane centering path in the target lane. For another example, when lateral acceleration of the vehicle is greater than a specified value (e.g., a curvature of a road is small), the control circuit 140 may determine that there is a high probability that the path following performance of the vehicle will be degraded and may control the vehicle to travel along the lane centering path in the target lane.

In some forms of the present disclosure, when a following vehicle approaches the vehicle from a lane neighboring to the target lane, the control circuit 140 may control the vehicle to travel along the lane centering path in the target lane until the following vehicle passes the vehicle. When the vehicle enters the target lane, the control circuit 140 may detect the following vehicle on the lane neighboring to the target lane using the sensor 110. The control circuit 140 may determine whether the following vehicle approaches the vehicle, based on a relative speed between the vehicle and the following vehicle. When the following vehicle approaches the vehicle, the control circuit 140 may control the vehicle to travel along the lane centering path to avoid close proximity to the following vehicle. The control circuit 140 may control the vehicle to travel along a deviated path in the target lane after the following vehicle passes the vehicle.

Figure 2:
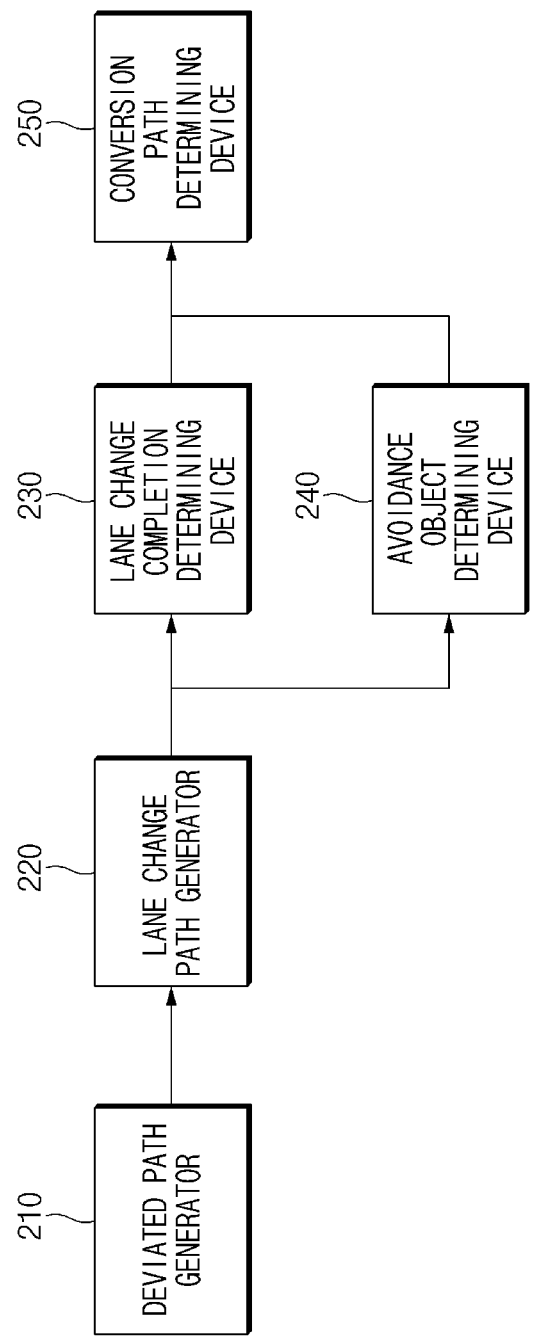
FIG. 2 is a block diagram illustrating a software module included in an apparatus for providing a driving path in a vehicle in one form of the present disclosure.

FIG. 2 is a block diagram illustrating a software module included in an apparatus for providing a driving path in a vehicle in some forms of the present disclosure.

Referring to FIG. 2, the apparatus for providing the driving path in some forms of the present disclosure may include a deviated path generator 210, a lane change path generator 220, a lane change completion determining device 230, an avoidance object determining device 240, and a conversion path determining device 250.

The deviated path generator 210 may determine whether an external object exists within a distance capable of giving a driver of the vehicle uneasiness on a lane neighboring to a driving lane of the vehicle. For example, when the external object exists during a specified time in a specified area from the vehicle, the deviated path generator 210 may determine that there is an object to be avoided. The deviated path generator 210 may determine whether a deviation occurs in the driving lane by steering control of the driver, a lateral gradient of a driving road of the vehicle, or a curvature of the road. When there is the object to be avoided or when the deviation occurs in the driving lane, the deviated path generator 210 may generate a deviated path in the driving lane.

When a lane change command of the driver is received, the lane change path generator 220 may generate a path for a lane change. The lane change path generator 220 may determine whether there is a probability that collision will occur during the lane change. When there is no possibility of collision, the lane change path generator 220 may generate a lane change path. When a deviation the driver does not intend occurs (e.g., when a deviation occurs by a lateral gradient of the road or a curvature of the road), the lane change path generator 220 may determine that it is impossible to perform a lane change and may fail to generate a path for the lane change. When a lane change command of the driver is received, when there is no possibility of collision, and when there is no deviation by a control limit, the lane change path generator 220 may generate a lane change path.

The lane change completion determining device 230 may determine whether the vehicle enters a target lane and whether a target vehicle is arranged on the center of a lane.

When the vehicle enters the target lane, the avoidance object determining device 240 may determine whether an object to be avoided exists on a lane neighboring to the target lane.

When the lane change is completed, the conversion path determining device 250 may generate a lane centering path or a deviated path and may control the vehicle to travel along the generated path. When a lateral position error greater than or equal to a reference value is maintained over a reference time, the conversion path determining device 250 may determine that path following performance is degraded by disturbance and may control the vehicle to follow the lane center. Similarly, when lateral acceleration is greater than or equal to a reference value, the conversion path determining device 250 may determine that there is a high probability that path following performance will be degraded and may control the vehicle to follow the lane center. When an object to be avoided exists on a lane neighboring to the target lane, the conversion path determining device 250 may generate a deviated path in a lane in a direction away from the object to be avoided and may control the vehicle to travel along the deviated path. When deviated driving is performed according to an intention of the driver before a lane change, the conversion path determining device 250 may control the vehicle to perform the deviated driving by reflecting the intention of the driver.

Figure 3:
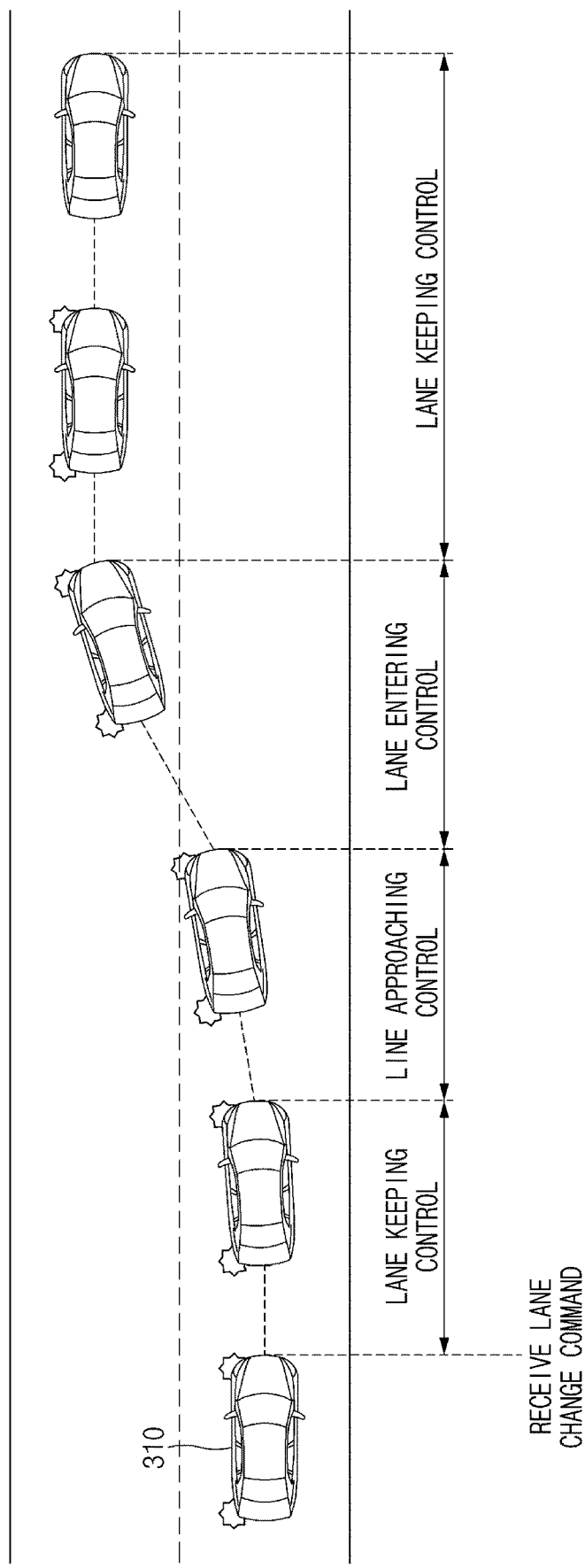
FIG. 3 is a drawing illustrating an exemplary operation of an apparatus for providing a driving path in a vehicle in one form of the present disclosure.

FIG. 3 is a drawing illustrating an exemplary operation of an apparatus for providing a driving path in a vehicle in some forms of the present disclosure.

Referring to FIG. 3, a vehicle 310 may perform a lane change toward a target lane from its driving lane. When a lane change command is received, the vehicle 310 may turn on/off a left turn signal. When the lane change command is received, the vehicle 310 may be traveling along a deviated path. The vehicle 310 may perform lane keeping control during a specified time interval after the lane change command is received and may then initiate line approaching control.

The vehicle 310 may perform the line approaching control toward a line between the driving lane and the target lane. The vehicle 310 may move toward the line in a lateral direction. The vehicle 310 may complete the line approaching control within a second time interval.

When the line approaching control is completed, the vehicle 310 may perform lane entering control. While lane entering control is performed, a wheel of the vehicle 310 may pass the line. The vehicle 310 may move toward the target lane in the lateral direction. The lane entering control may continue until all wheels of the vehicle 310 pass the line from the wheel of the vehicle 310 starts to pass the line.

When the lane entering control is completed, the vehicle 310 may perform lane keeping control. The vehicle 310 may move toward the center of the target lane in the lateral direction. When moving to the center of the target lane, the vehicle 310 may turn off the left turn signal. The vehicle 310 may generate a deviated path in the lane in consideration of a deviated driving state, a location of an external object, and the like when receiving the lane change command and may travel along the deviated path.

Figure 4:
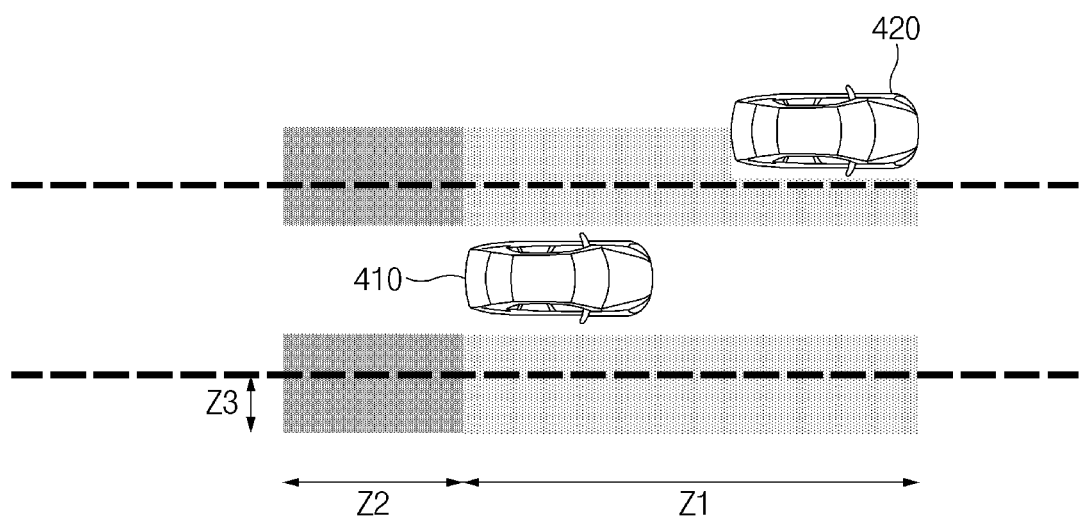
FIG. 4 is a drawing illustrating an exemplary operation of an apparatus for providing a driving path in a vehicle in one form of the present disclosure.

FIG. 4 is a drawing illustrating an exemplary operation of an apparatus for providing a driving path in a vehicle in some forms of the present disclosure.

Referring to FIG. 4, a vehicle 410 in some forms of the present disclosure may detect an external object 420 located on a lane neighboring to a lane where the vehicle 410 is traveling. The vehicle 410 may determine whether the external object 420 exists within a specified area. For example, the vehicle 410 may determine whether the external object 420 exists within a specified distance Z2 (e.g., 5 m) in a longitudinal direction from a front bumper and a rear bumper of the vehicle 410 and within a specified distance Z3 (e.g., 30 cm) in a lateral direction from a line. When the external object 420 exists within area Z1-Z3, the vehicle 410 may determine the external object 420 as an object to be avoided. When the external object 420 moves from area Z1-Z3 to area Z2-Z3, the vehicle 410 may release the external object 420 from the object to be avoided. When the external object 420 exists within a specified area in a left direction of the vehicle 410, the vehicle 420 may generate a deviated path in a right direction in the lane and may perform deviated driving along the generated path.

Figure 5:
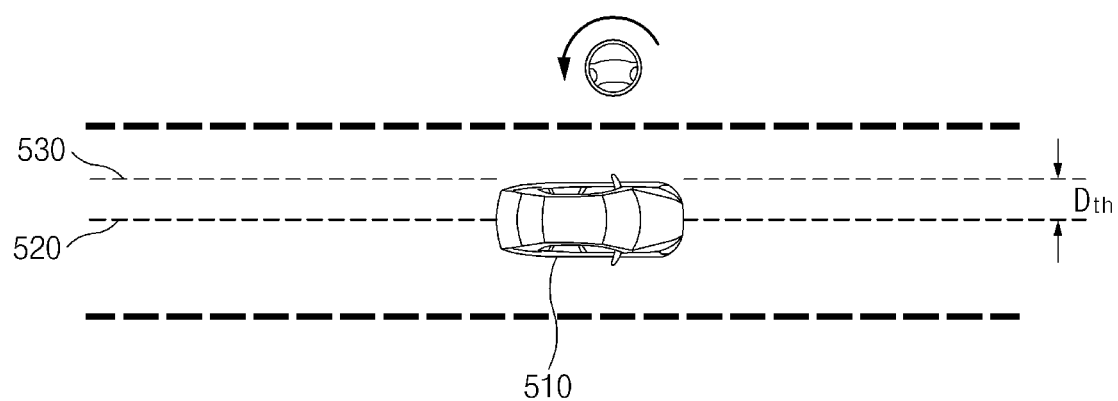
FIG. 5 is a drawing illustrating an exemplary operation of an apparatus for providing a driving path in a vehicle in one form of the present disclosure.

FIG. 5 is a drawing illustrating an exemplary operation of an apparatus for providing a driving path in a vehicle in some forms of the present disclosure.

Referring to FIG. 5, a vehicle 510 in some forms of the present disclosure may travel along a centering path 520 in a lane where it is traveling. The vehicle 510 may perform deviated driving depending on an operation of a steering wheel of its driver. When the vehicle 510 travels in a state where it deviates from the centering path 520 over a specified distance Dth by an operation of the steering wheel during a specified time, it may generate a deviated path 530. In this case, the vehicle 510 may determine that the driver has an intention to perform deviated driving. While the vehicle 510 travels along the deviated path 530, when a lane change command is received, the vehicle 510 may generate a deviated path in a changed lane after the lane change and may travel along the deviated path.

Figure 6:
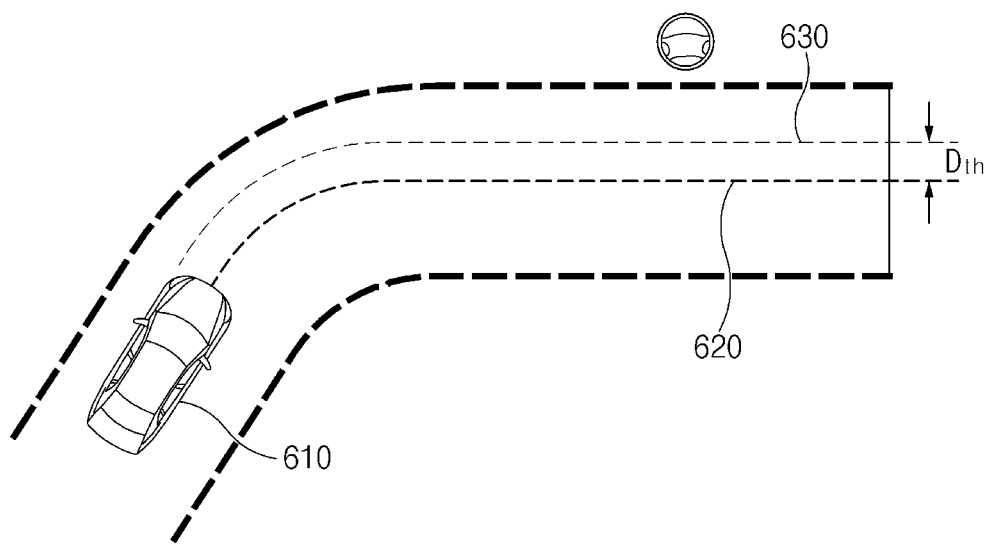
FIG. 6 is a drawing illustrating an exemplary operation of an apparatus for providing a driving path in a vehicle in one form of the present disclosure.

FIG. 6 is a drawing illustrating an exemplary operation of an apparatus for providing a driving path in a vehicle in some forms of the present disclosure.

Referring to FIG. 6, a vehicle 610 in some forms of the present disclosure may travel along a centering path 620 in a lane where it is traveling. The vehicle 610 may travel in a state where it departs from the centering path 620 by a lateral gradient of a road where it is traveling or a curvature of the road. When the vehicle 610 travels in a state where it deviates from the centering path 620 over a specified distance Dth by disturbance (e.g., when a steering torque is less than or equal to a specified value) rather than an operation of a steering wheel of the vehicle 610, it may generate a deviated path 630. In this case, the vehicle 610 may determine that its driver does not have an intention to perform deviated driving. While the vehicle 610 travels along the deviated path 630, when a lane change command is received, the vehicle 610 may generate a centering path after a lane change and may travel along the centering path. Although the lane change command is received, the vehicle 610 may fail to perform a lane change.

Figure 7:
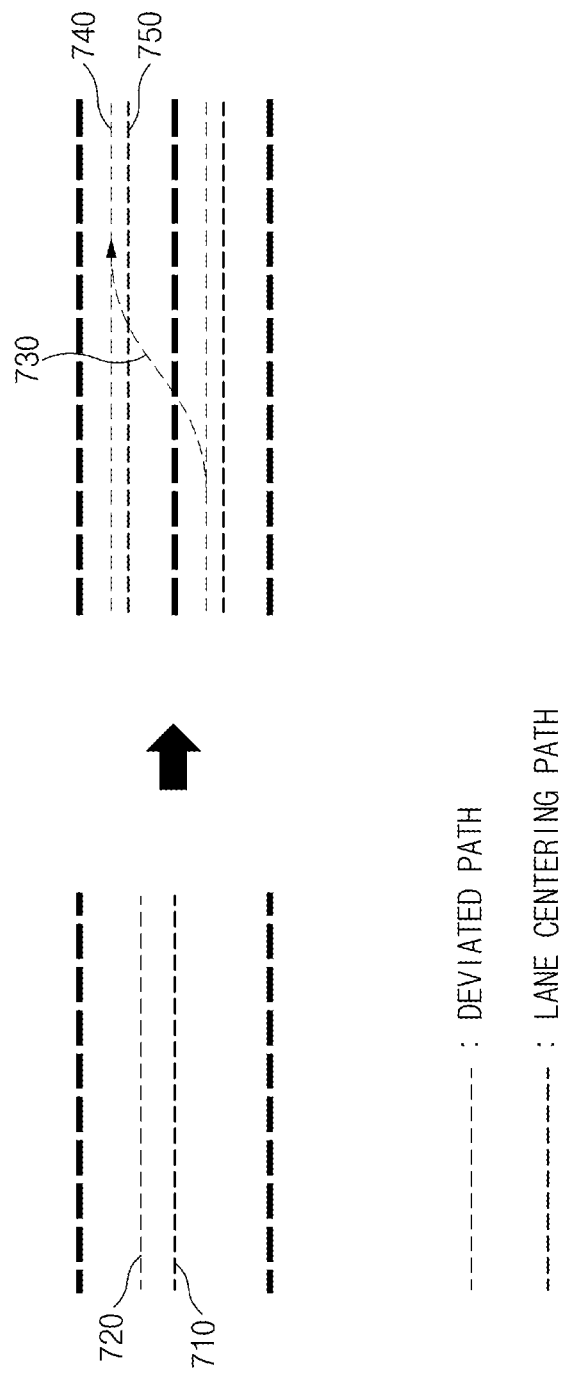
FIG. 7 is a drawing illustrating an exemplary operation of an apparatus for providing a driving path in a vehicle in one form of the present disclosure.

FIG. 7 is a drawing illustrating an exemplary operation of an apparatus for providing a driving path in a vehicle in some forms of the present disclosure.

Referring to FIG. 7, the vehicle in some forms of the present disclosure may travel along a deviated path 720 in response to an external object or an operation of a steering wheel of its driver. When a lane change command is received from the driver, the vehicle may generate a lane change path 730 including the deviated path 720 and a deviated path 740. A distance between the deviated path 740 and a lane centering path 750 may be set to correspond to a distance between the deviated path 720 and a lane centering path 710. Thus, the lane change path 730 may be generated in consideration of an intention of the driver to perform deviated driving.

Figure 8:
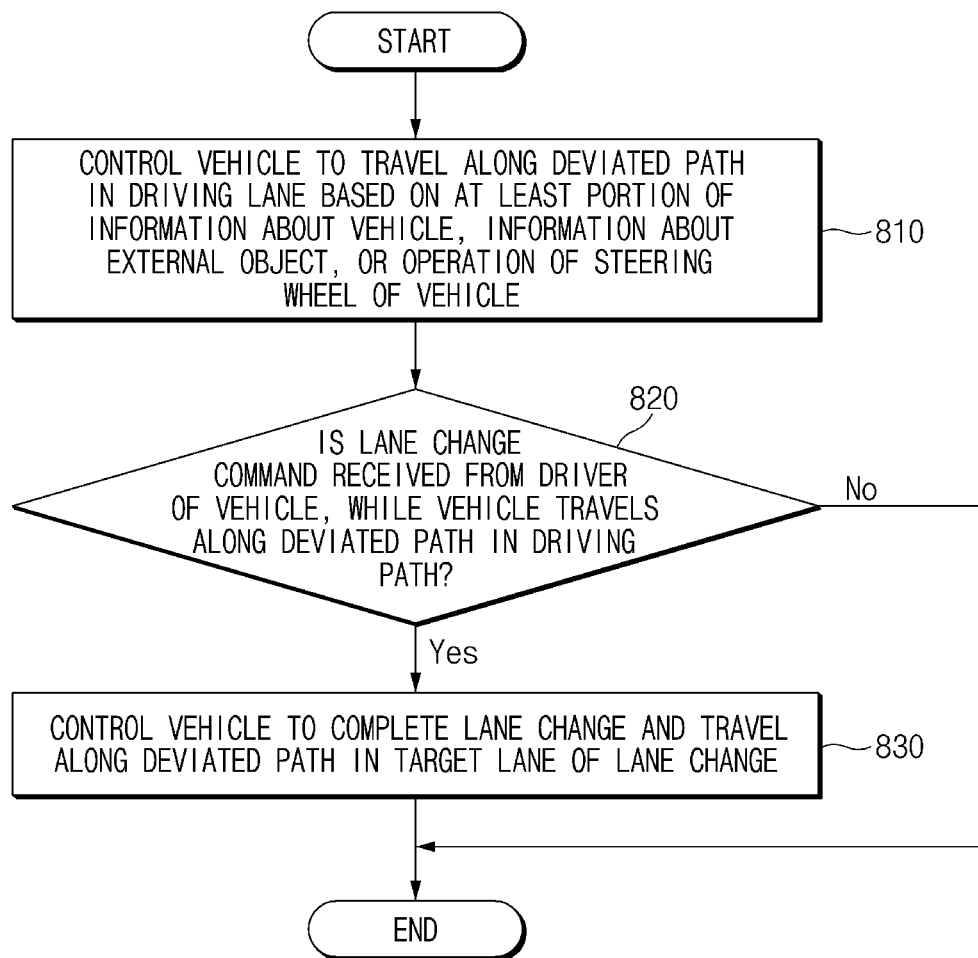
FIG. 8 is a flowchart illustrating a method for providing a driving path in a vehicle in one form of the present disclosure.

FIG. 8 is a flowchart illustrating a method for providing a driving path in a vehicle in some forms of the present disclosure.

Hereinafter, it is assumed that a vehicle including an apparatus 100 for providing a driving path in FIG. 1 performs a process of FIG. 8. Furthermore, in a description of FIG. 8, an operation described as being by the vehicle may be understood as being controlled by a control circuit 140 of the apparatus 100 for providing the driving path.

Referring to FIG. 8, in operation 810, the vehicle may control itself to travel along a deviated path in its driving lane based on at least a portion of information about the vehicle, information about an external object, or an operation of a steering device of the vehicle. For example, the vehicle may perform deviated driving depending on lateral acceleration of the vehicle, proximity of the external object, an operation of the steering wheel of the driver, and/or the like.

In operation 820, while the vehicle travels along the deviated path in the driving lane, it may receive a lane change command from its driver. For example, the vehicle may receive an input of the driver to its turn signal lever.

When the lane change command is received, in operation 830, the vehicle may control itself to complete a lane change and travel along a deviated path in a target lane of the lane change. For example, when the vehicle performs deviated driving upon the reception of the lane change command, it may perform deviated driving after the lane change. The vehicle may consider an intention of the driver to perform deviated driving and may consider a surrounding object capable of giving the driver uneasiness.

Figure 9:
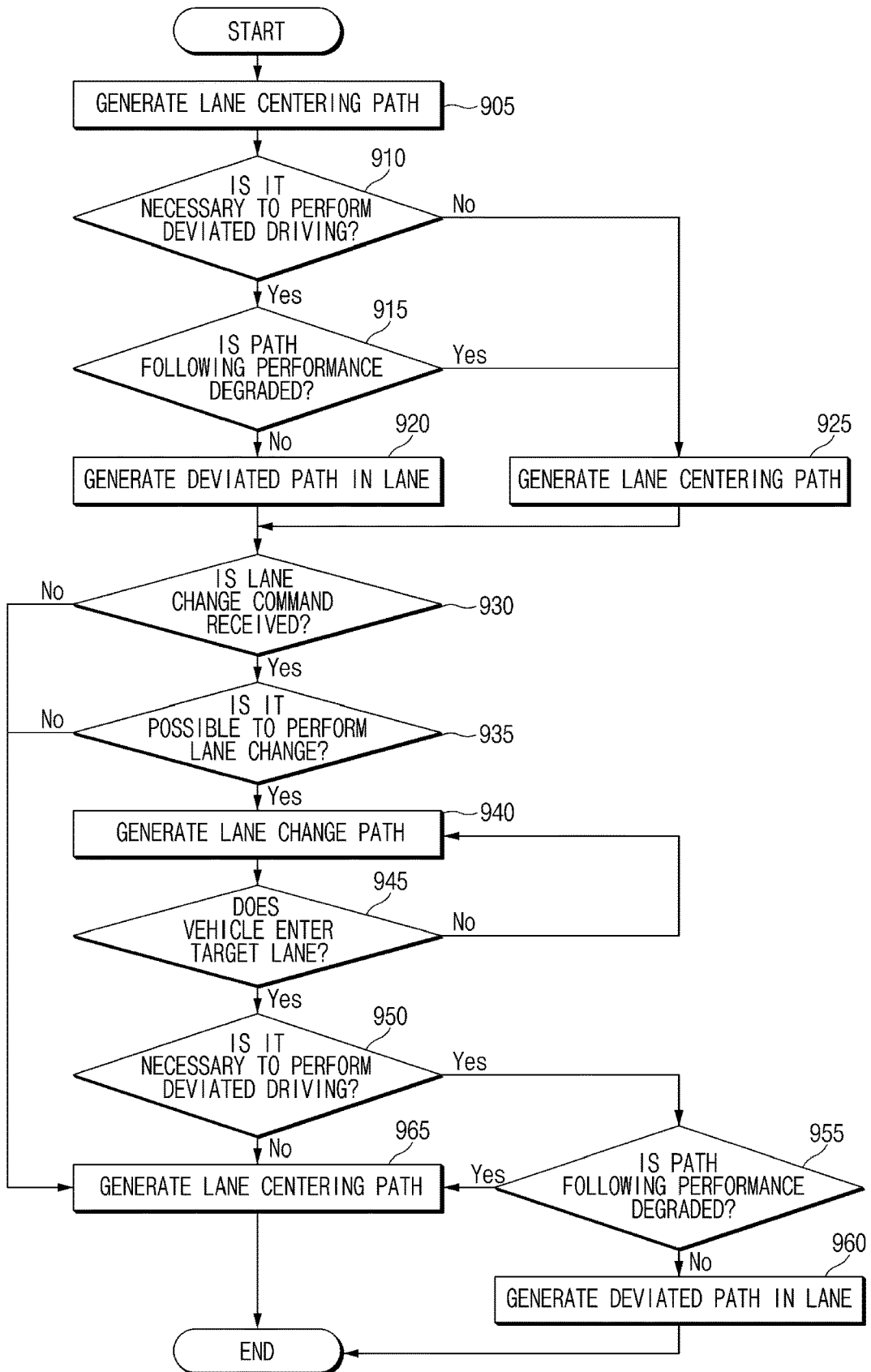
FIG. 9 is a flowchart illustrating a method for providing a driving path in a vehicle in one form of the present disclosure.

FIG. 9 is a flowchart illustrating a method for providing a driving path in a vehicle in some forms of the present disclosure.

Hereinafter, it is assumed that a vehicle including an apparatus 100 for providing a driving path in FIG. 1 performs a process of FIG. 9. Furthermore, in a description of FIG. 9, an operation described as being by the vehicle may be understood as being controlled by a control circuit 140 of the apparatus 100 for providing the driving path.

Referring to FIG. 9, in operation 905, the vehicle may generate a lane centering path. The vehicle may travel along the lane centering path.

In operation 910, the vehicle may determine whether it is necessary to perform deviated driving. For example, the vehicle may determine whether there is an external object capable of giving its driver uneasiness or whether the driver has an intention to perform deviated driving (e.g., an operation of the driver for its steering wheel).

When it is determined that it is necessary to perform the deviated driving, in operation 915, the vehicle may determine whether path following performance is degraded. For example, the vehicle may determine whether the path following performance is degraded with reference to a lateral gradient of a road where the vehicle is traveling, lateral acceleration of the vehicle, and/or the like.

When the path following performance is not degraded, in operation 920, the vehicle may generate a deviated path in a lane where the vehicle is traveling. The vehicle may travel along the deviated path.

When it is determined that it is unnecessary to perform the deviated driving or when the path following performance is degraded, in operation 925, the vehicle may generate a lane centering path. The vehicle may travel along the lane centering path.

In operation 930, the vehicle may receive a lane change command. For example, the vehicle may receive the lane change command from the driver through its turn signal lever.

When the lane change command is received, in operation 935, the vehicle may determine whether it is possible to perform a lane change. For example, the vehicle may determine whether it is possible to perform the lane change, based on a probability of collision, whether path following performance is degraded, a speed of the vehicle, a curvature of the road, and/or the like.

When it is determined that it is possible to perform the lane change, in operation 940, the vehicle may generate a lane change path. The vehicle may travel along the lane change path.

In operation 945, the vehicle may determine whether it enters a target lane. The vehicle may travel along the lane change path until it enters the target lane. When the vehicle enters the target lane, the lane change may be ended.

When the vehicle enters the target lane, in operation 950, the vehicle may determine whether it is necessary to perform deviated driving. For example, the vehicle may determine whether an external object capable of giving the driver uneasiness exists within a specified area on the changed lane, whether the driver intends to performs deviated driving before the lane change, or whether the driver currently intends to perform deviated driving.

When it is determined that it is necessary to perform the deviated driving, in operation 955, the vehicle may determine whether path following performance is degraded.

When the path following performance is not degraded, in operation 960, the vehicle may generate a deviated path in the lane. The vehicle may travel along the deviated path.

When it is determined that it is unnecessary to perform the deviated driving or when the path following performance is degraded, in operation 965, the vehicle may generate a lane centering path. The vehicle may travel along the lane centering path.

Figure 10:
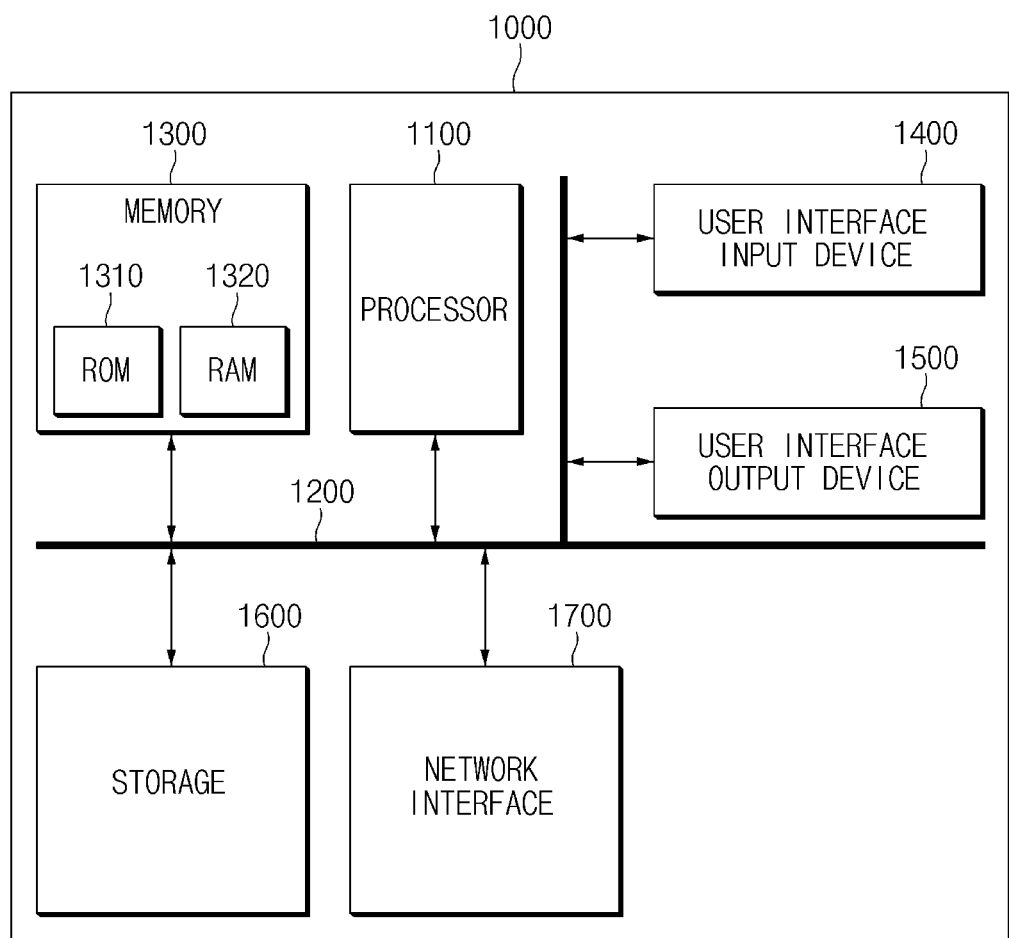
FIG. 10 is a block diagram illustrating a configuration of a computing system in one form of the present disclosure.

FIG. 10 is a block diagram illustrating a configuration of a computing system in some forms of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for providing the driving path in the vehicle in some forms of the present disclosure may provide a path in which the intention of the driver is reflected upon an automatic lane change by determining the intention of the driver and providing a deviated driving path.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for providing a driving path of a vehicle, the apparatus comprising:
    a plurality of sensors configured to obtain information regarding the vehicle and information regarding an external object;
    a steering device;
    an input device configured to receive a lane change command from a driver of the vehicle; and
    a control circuit electrically connected with the plurality of sensors, the steering device, and the input device and configured to:
        control the vehicle to travel along a deviated path in a driving lane of the vehicle based on at least one of the information regarding the vehicle, the information regarding the external object, or an operation of the steering device;
        control the vehicle to complete a lane change and travel along a deviated path in a changed lane in response to the received lane change command when the vehicle travels along the deviated path in the driving lane;
        determine an intention of the driver to perform a deviated driving based on the operation of the steering device;
        generate the deviated path in the changed lane in response to the received lane change command when the driver is determined to intend to perform the deviated driving, wherein the deviated driving means the vehicle travels along a deviated path which departs from a lane center path in the driving lane;
        generate a lane centering path in response to a determination that a path following performance of the vehicle is degraded;
        control the vehicle to travel along the generated lane centering path when the lane change is completed and the path following performance of the vehicle is degraded; and
        determine that the driver intends to perform the deviated driving when:
            a steering torque greater than a first predetermined value is generated at a first predetermined time; and
            the vehicle is away from a center of the driving lane at a distance greater than a predetermined distance.

2. The apparatus of claim 1, wherein the control circuit is further configured to:
    determine the intention of the driver to perform the deviated driving based on the operation of the steering device; and
    generate a lane center path in the changed lane in response to the received lane change command when the driver is determined not to intend to perform the deviated driving.

3. The apparatus of claim 2, wherein the control circuit is configured to determine that the driver does not intend to perform the deviated driving when:
    the steering torque less than or equal to the first predetermined value is generated at the first predetermined time; and
    the vehicle is away from the center of the driving lane at the distance greater than the predetermined distance.

4. The apparatus of claim 1, wherein the control circuit is further configured to:
    generate the deviated path in the changed lane such that the vehicle is away from the external object when the external object is detected in a specified area of a lane adjoining to the changed lane.

5. The apparatus of claim 4, wherein the control circuit is configured to:
    determine whether to generate the deviated path in the changed lane after the vehicle enters the changed lane.

6. The apparatus of claim 1, wherein the control circuit is further configured to:
    control the vehicle to travel along a lane center path in the changed lane when a lateral position error is greater than a second predetermined value at a second predetermined time,
    wherein the lateral position error means a distance between a path generated by the control circuit and a real driving path.

7. The apparatus of claim 1, wherein the control circuit is further configured to:
    control the vehicle to travel along a lane center path in the changed lane when a lateral acceleration of the vehicle is greater than a third predetermined value.

8. The apparatus of claim 1, wherein the control circuit is further configured to:
    when a following vehicle approaches the vehicle from a lane adjoining to the changed lane, control the vehicle to travel along a lane center path in the changed lane until the following vehicle passes the vehicle; and
    control the vehicle to travel along the deviated path in the changed lane after the following vehicle passes the vehicle.

9. A method for providing a driving path of a vehicle, the method comprising:
    controlling, with a control circuit, the vehicle to travel along a deviated path in a driving lane of the vehicle based on at least one of information regarding the vehicle, information regarding an external object, or an operation of a steering device of the vehicle; and
    controlling, with the control circuit, the vehicle to complete a lane change and travel along a deviated path in a changed lane in response to a lane change command received from a driver of the vehicle when the vehicle travels along the deviated path in the driving lane;
    determining, with the control circuit, an intention of the driver to perform a deviated driving based on the operation of the steering device;
    when it is determined that the driver intends to perform the deviated driving, generating, with the control circuit, the deviated path in the changed lane in response to the received lane change command, wherein the deviated driving means the vehicle travels along a deviated path which departs from a lane center path in the driving lane;

generating, with the control circuit, a lane centering path in response to a determination that a path following performance of the vehicle is degraded;

controlling, with the control circuit, the vehicle to travel along the generated lane centering path when the lane change is completed and the path following performance of the vehicle is degraded; and determining, with the control circuit, that the driver intends to perform the deviated driving when:
  a steering torque greater than a first predetermined value is generated at a first predetermined time; and
  the vehicle is away from a center of the driving lane at a distance greater than a predetermined distance.

10. The method of claim 9, wherein the method further comprises:
  when it is determined that the driver does not intend to perform the deviated driving, generating, with the control circuit, a lane center path in the changed lane in response to the received lane change command.

11. The method of claim 9, wherein controlling the vehicle to travel along the deviated path in the changed lane comprises:
  when the external object is detected in a specified area of a lane adjoining to the changed lane, generating, with the control circuit, the deviated path in the changed lane such that the vehicle is away from the external object.

12. The method of claim 9, wherein the method further comprises:
  when a lateral position error is greater than a second predetermined value at a first predetermined time, controlling, with the control circuit, the vehicle to travel along a lane center path in the changed lane,
  wherein the lateral position error means a distance between a path generated by the control circuit and a real driving path.

13. The method of claim 9, wherein the method further comprises:
  when a lateral acceleration of the vehicle is greater than a third predetermined value, controlling, with the control circuit, the vehicle to travel along a lane center path in the changed lane.

14. The method of claim 9, wherein controlling the vehicle to travel along the deviated path in the changed lane comprises:
  when a following vehicle approaches the vehicle from a lane adjoining to the changed lane, controlling, with the control circuit, the vehicle to travel along a lane center path in the changed lane until the following vehicle passes the vehicle; and
  controlling, with the control circuit, the vehicle to travel along the deviated path in the changed lane after the following vehicle passes the vehicle.

* * * * *